US008413204B2

(12) United States Patent
White et al.

(10) Patent No.: US 8,413,204 B2
(45) Date of Patent: Apr. 2, 2013

(54) SYSTEM AND METHOD OF INTERACTING WITH HOME AUTOMATION SYSTEMS VIA A SET-TOP BOX DEVICE (75) Inventors: Scott White, Austin, TX (US); James L. Cansler, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 466 days.

(21) Appl. No.: 12/059,726

(22) Filed: Mar. 31, 2008

(65) Prior Publication Data

US 2009/0249428 A1    Oct. 1, 2009

(51) Int. Cl.
*H04N 7/173* (2011.01)
(52) U.S. Cl. ............... 725/133; 725/33; 725/110
(58) Field of Classification Search .............. 725/74, 725/78–84, 100, 108, 131, 133, 139, 141, 725/151, 153; 340/500, 539.14, 539.26
See application file for complete search history.

(56) References Cited

U.S. PATENT DOCUMENTS

| | | | |
|---|---|---|---|
| 5,706,388 A * | 1/1998 | Isaka .................... | 386/206 |
| 5,805,806 A * | 9/1998 | McArthur .................... | 709/250 |
| 6,658,091 B1 * | 12/2003 | Naidoo et al. .................... | 379/37 |
| 6,683,526 B2 * | 1/2004 | Bellin .................... | 340/3.43 |
| 6,816,069 B2 * | 11/2004 | Quigley .................... | 340/521 |
| 7,079,176 B1 * | 7/2006 | Freeman et al. .................... | 348/207.1 |
| 7,123,142 B2 * | 10/2006 | Bohbot et al. .................... | 340/539.14 |
| 7,149,798 B2 * | 12/2006 | Rezvani et al. .................... | 709/224 |
| 7,231,603 B2 * | 6/2007 | Matsumoto .................... | 715/716 |
| 7,342,488 B2 * | 3/2008 | Wolfe et al. .................... | 340/500 |
| 7,373,395 B2 * | 5/2008 | Brailean et al. .................... | 709/219 |
| 7,449,999 B2 * | 11/2008 | Hevia et al. .................... | 340/531 |
| 7,583,191 B2 * | 9/2009 | Zinser .................... | 340/541 |
| 2002/0016971 A1 * | 2/2002 | Berezowski et al. .................... | 725/105 |
| 2002/0032875 A1 * | 3/2002 | Kashani .................... | 713/300 |
| 2002/0097165 A1 | 7/2002 | Hulme | |
| 2002/0124252 A1 * | 9/2002 | Schaefer et al. .................... | 725/33 |
| 2003/0018975 A1 * | 1/2003 | Stone .................... | 725/105 |
| 2004/0085205 A1 * | 5/2004 | Yeh .................... | 340/540 |
| 2004/0090391 A1 * | 5/2004 | Kondo .................... | 345/1.1 |
| 2004/0113770 A1 * | 6/2004 | Falk et al. .................... | 340/531 |
| 2004/0131357 A1 * | 7/2004 | Farmer et al. .................... | 398/67 |
| 2004/0148632 A1 * | 7/2004 | Park et al. .................... | 725/81 |
| 2005/0028208 A1 * | 2/2005 | Ellis et al. .................... | 725/58 |
| 2005/0071879 A1 * | 3/2005 | Haldavnekar et al. .................... | 725/81 |
| 2005/0108091 A1 * | 5/2005 | Sotak et al. .................... | 705/14 |
| 2005/0169056 A1 * | 8/2005 | Berkman et al. .................... | 365/185.22 |
| 2005/0198063 A1 * | 9/2005 | Thomas et al. .................... | 707/102 |
| 2005/0235312 A1 * | 10/2005 | Karaoguz et al. .................... | 725/38 |
| 2005/0251827 A1 * | 11/2005 | Ellis et al. .................... | 725/47 |
| 2005/0262542 A1 * | 11/2005 | DeWeese et al. .................... | 725/106 |
| 2005/0280704 A1 * | 12/2005 | Clare et al. .................... | 348/143 |
| 2006/0025132 A1 * | 2/2006 | Karaoguz et al. .................... | 455/433 |
| 2006/0053447 A1 * | 3/2006 | Krzyzanowski et al. .................... | 725/40 |
| 2006/0080408 A1 | 4/2006 | Istvan et al. | |
| 2006/0123053 A1 * | 6/2006 | Scannell, Jr. .................... | 707/104.1 |
| 2006/0273895 A1 * | 12/2006 | Kollin .................... | 340/539.17 |

(Continued)

*Primary Examiner* — An Son P Huynh
(74) *Attorney, Agent, or Firm* — Guntin & Gust, PLC; Ed Guntin (57) ABSTRACT

A method of interacting with home automation systems via a set-top box device is disclosed and includes receiving data at a set-top box device from one of a plurality of home automation systems communicating with the set-top box device. The data indicating that a triggering event has been detected at the home automation system. The method also includes sending an alert to a display device coupled to the set-top box device indicating that the triggering event has occurred.

12 Claims, 7 Drawing Sheets

U.S. PATENT DOCUMENTS

| | | | |
|---|---|---|---|
| 2006/0294565 A1 | 12/2006 | Walter | |
| 2007/0109121 A1* | 5/2007 | Cohen | 340/539.26 |
| 2007/0112939 A1 | 5/2007 | Wilson et al. | |
| 2007/0124608 A1* | 5/2007 | Knowlson et al. | 713/300 |
| 2007/0139553 A1* | 6/2007 | Kister et al. | 348/468 |
| 2007/0156060 A1* | 7/2007 | Cervantes | 600/534 |
| 2007/0157281 A1* | 7/2007 | Ellis et al. | 725/134 |
| 2007/0192486 A1* | 8/2007 | Wilson et al. | 709/225 |
| 2007/0268121 A1* | 11/2007 | Vasefi et al. | 340/506 |
| 2007/0285510 A1* | 12/2007 | Lipton et al. | 348/135 |
| 2007/0288975 A1 | 12/2007 | Cashman et al. | |
| 2008/0022322 A1* | 1/2008 | Grannan et al. | 725/78 |
| 2008/0092199 A1* | 4/2008 | McCarthy et al. | 725/133 |
| 2008/0117922 A1* | 5/2008 | Cockrell et al. | 370/401 |
| 2008/0129821 A1* | 6/2008 | Howarter et al. | 348/143 |
| 2008/0201731 A1* | 8/2008 | Howcroft | 725/13 |
| 2009/0150925 A1* | 6/2009 | Henderson | 725/34 |

* cited by examiner

SYSTEM AND METHOD OF INTERACTING WITH HOME AUTOMATION SYSTEMS VIA A SET-TOP BOX DEVICE

FIELD OF THE DISCLOSURE

The present disclosure generally relates to interacting with home automation systems via a set-top box device.

BACKGROUND

Television viewing is a common activity. A viewer may desire a variety of devices at a home to provide different functions during a television program without close viewer proximity to each device. In addition, the viewer may desire to be notified of certain activities in parts of the home where the viewer is not present.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed systems, methods or computer-readable media. Moreover, some statements may apply to some inventive features but not to others.

Figure 1:
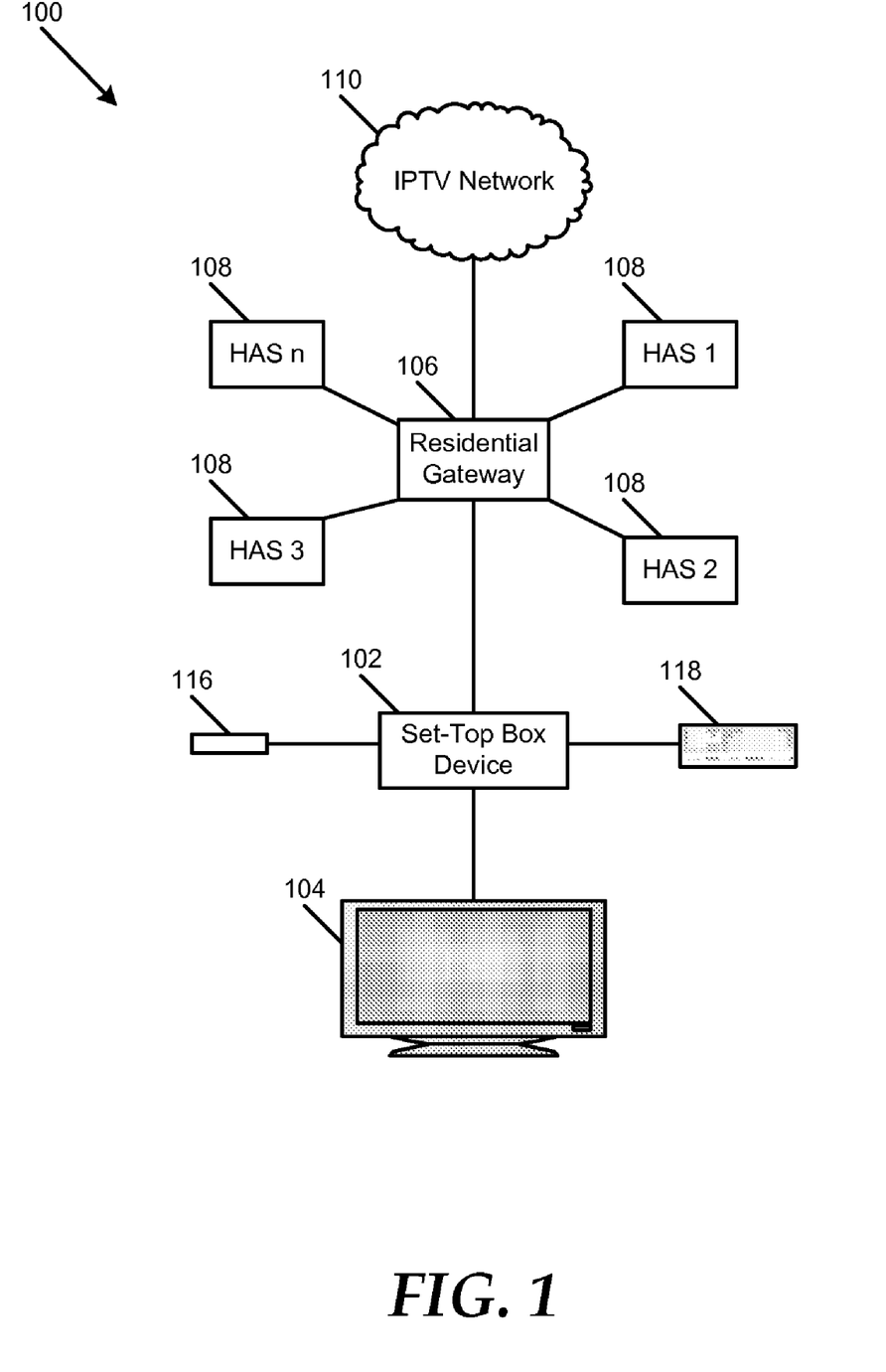
FIG. 1 is a block diagram illustrating a particular embodiment of a system to interact with home automation systems via a set-top box device.

FIG. 1 illustrates a particular embodiment of a system 100 to interact with home automation systems via a set-top box device. The system 100 includes a set-top box device 102 that is coupled to a display device 104, such as a television. The set-top box device 102 is adapted to communicate with a video content network, such as an Internet Protocol Television (IPTV) access network 110. The set-top box device 102 is also adapted to communicate with a plurality of home automation systems 108, such as the home monitoring automation systems HAS 1 . . . n. Examples of home automation systems 108 can include environmental systems, lighting systems, in-home monitoring systems, security systems, appliance systems, VoIP phone systems, other phone systems, other home automation systems, or any combination thereof. In a particular embodiment, the set-top box device 102 is adapted to communicate with each of the home automation systems 108 via a residential gateway 106 or other home network device.

In a particular embodiment, the set-top box device 102 is adapted to receive settings associated with one or more of the home automation systems 108. The settings at least partially relate to triggering events corresponding to the home automation system(s) 108. The settings can specify one or more triggering events, responses to each of the triggering event(s), whether a user is to be alerted of each of the triggering event(s), whether the set-top box device is to provide an interface to receive user input in response to each of the triggering event(s), other settings, or any combination thereof.

For example, the set-top box device 102 can be adapted to receive settings associated with an environmental system indicating that the user is to be alerted when a particular temperature is detected by an HVAC system inside the user's home; when a certain temperature is detected outside the user's home; when a hazard is detected, such as smoke, fire, a water leak or a gas leak; when another environmental triggering event occurs; or any combination thereof.

In another example, the set-top box device 102 can be adapted to receive settings associated with a lighting system indicating that one or more lights within the user's home are to be changed when instructed by the set-top box device 102; when the user is detected coming into the home; when the user is away from the home at a certain time of day; when a possible intrusion is detected by a security system; when a doorbell rings; when other lighting triggering events occur; or any combination thereof.

In a further example, the set-top box device 102 can be adapted to receive settings associated with an in-home monitoring system indicating that the user is to be alerted when a threshold noise level is detected by the in-home monitoring system (e.g., a noise level associated with a baby crying); when a computing system within the home accesses the Internet; when another in-home monitoring triggering event occurs; or any combination thereof. In an additional example, the set-top box device 102 can be adapted to receive settings associated with a security system indicating that the user is to be alerted when a noise level, noise frequency, other noise characteristic, or any combination thereof is detected (e.g., a window breaking, pool water splashing); when a motion is detected; when an entry to the home or associated property is opened (e.g., a door or a gate); when a doorbell rings; when another security triggering event occurs; or any combination thereof.

In still another example, the set-top box device 102 can be adapted to receive settings indicating that one or more responses (e.g., implement a certain lighting scene, silence one or more phones, etc.) are to be implemented at a start time of a particular television program, such as a video-on-demand movie, or upon selection of a channel, a type of television program, or a combination thereof.

In an illustrative embodiment, the set-top box device 102 can be adapted to receive settings associated with various home automation systems 108 via one or more graphical user interfaces (GUIs), application programming interfaces (APIs), or any combination thereof. For instance, the set-top box device 102 can be adapted to provide one or more interfaces at the display device 104 and to receive inputs via the interfaces from a remote control 116, a keyboard 118, another input device, or any combination thereof.

The set-top box device 102 is adapted to send data indicating user settings to corresponding home automation systems 108 via the residential gateway 106. The settings data can include data specifying a triggering event, data indicating that the set-top box device is to be notified of the triggering event, other settings data related to user settings, or any combination thereof. For instance, the set-top box device 102 can be adapted to send settings data to an environmental system indicating that the detection of a particular temperature is a triggering event. In another example, the set-top box device 102 can be adapted to send data to a security system or in-home monitoring system indicating that the detection of a threshold noise level is a triggering event.

The set-top box device 102 is adapted to detect a triggering event. In one embodiment, the set-top box device 102 can detect a triggering event in response to data received from a home automation system 108 indicating that the triggering event has occurred. For instance, if an in-home monitoring system detects a threshold noise level that has been set as a triggering event, the in-home monitoring system is adapted to send data to the set-top box device 102 indicating that the threshold noise level has been detected. In another embodiment, the set-top box device 102 can detect a triggering event that occurs at the set-top box device, such as a user selecting a channel, a television program, a type of television program, or a combination thereof.

The set-top box device 102 is adapted to access user settings related to a triggering event, when the set-top box device detects the triggering event. The set-top box device is adapted to determine based on the user settings whether it is to alert a user in response to detecting the triggering event. For instance, if the triggering event is a detection of a threshold noise level by an in-home monitoring system, the set-top box device 102 can be adapted to determine that it is to alert the user. Whereas, if the triggering event is the selection of a television program by the user, the set-top box device 102 can be adapted to determine that it is not to alert the user. If the set-top box device 102 determines that it is to alert the user, the set-top box device 102 provides an alert to the user via the display device 104. The alert can include video, audio, text, graphics, or any combination thereof. In an illustrative embodiment, the alert can include displaying content from a web camera or other camera associated with a home automation system via a picture-in-picture (PiP) display at the display device.

The set-top box device 102 is adapted to determine based on user settings whether it is to provide an input interface at the display device 104 in response to the triggering event. For example, where the triggering event includes the detection of a particular indoor temperature, the set-top box device 102 can be adapted to provide a graphical user interface at the display device 104 that includes selectable indicators of one or more options, such as activation or deactivation of a heater or air conditioner, a desired indoor temperature, other options, or any combination thereof. The set-top box device 102 is adapted to receive user input via the interface.

Additionally, the set-top box device 102 is adapted to determine whether it is to implement a response to the triggering event based on user settings, user input, or a combination thereof. In a particular embodiment, a response can include alteration of at least one device associated with at least one home automation system 108. For example, if the triggering event is the selection of a particular television program, the set-top box device 102 can be adapted to determine based on user settings that the set-top box device 102 is to send data instructing a lighting system to change one or more lights to achieve a lighting scene specified by the user settings. In another example, if the set-top box device 102 has received user input specifying a desired indoor temperature, the set-top box device 102 can be adapted to determine that it is to send data instructing an environmental system to activate or deactivate a heater or air conditioner. The set-top box device 102 is adapted to send data to a corresponding home automation system instructing the home automation system to implement the response by altering one or more devices associated with the home automation system.

Each home automation system 108 is adapted to receive and store settings data from the set-top box device 102. The settings data can include, for example, one or more triggering events detectable by the home automation system 108, an indication that the set-top box device 102 is to be notified of a triggering event, other data, or any combination thereof. The home automation system 108 is adapted to detect a triggering event and to send data to the set-top box device 102 indicating that the triggering event has occurred. In one embodiment, the home automation system 108 can be adapted to send video content from a web camera or other camera to the set-top box device 102 according to settings data or an instruction received from the set-top box device 102.

Further, each home automation system 108 is adapted to alter a device associated with the home automation system in response to an instruction received from the set-top box device 102, e.g., in response to a triggering event at the home automation system, at the set-top box device, at another home automation system, or any combination thereof.

Figure 2:
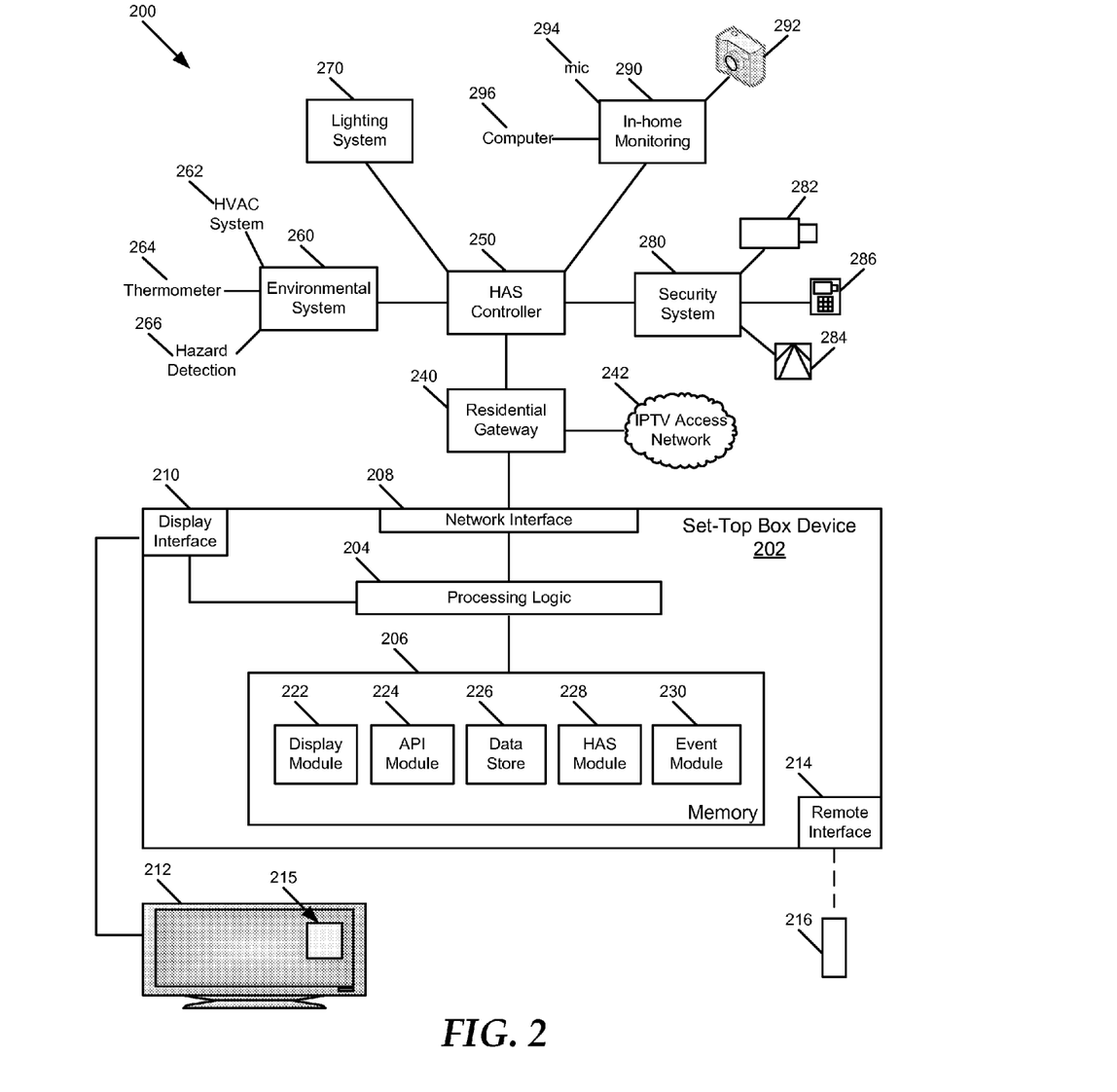
FIG. 2 is a block diagram illustrating a second particular embodiment of a system to interact with home automation systems via a set-top box device.

FIG. 2 illustrates a second particular embodiment of a system 200 to deliver home monitoring and automation system alerts. The system 200 includes a set-top box device 202 that is coupled to a display device 212. The set-top box device 202 communicates with a plurality of home automation systems (HASs) 260-290. The set-top box device 202 communicates with a video content network, such as an Internet Protocol Television (IPTV) network 242, via a residential gateway 240, or other customer premises equipment device. In a particular embodiment, each of the home automation systems 260-290 can communicate with the residential gateway 240 via a HAS controller system 250. In an illustrative, non-limiting embodiment, the home automation systems can be adapted to not communicate with the IPTV access network 242 or other networks external to the location of the set-top box device 202.

The home automation systems can include an environmental system 260, which may be adapted to communicate with an HVAC system 262, one or more thermometers 264, one or more hazard detection devices 266, other environmental devices, or any combination thereof. The home automation systems can also include a lighting system 270 that is adapted to communicate with one or more lights, switches, dimmers, or any combination thereof. Further, the home automation systems can include a security system 280 that is adapted to communicate with one or more security cameras 282, one or more motion detectors 284, one or more security system control devices 286, or any combination thereof. In addition, the home automation systems can include an in-home monitoring system, such as a child monitoring system, that communicates with a web camera 292 or other camera, a microphone 294, a computing device 296, other devices, or any combination thereof.

In a particular embodiment, the set-top box device 202 includes processing logic 204 and memory 206 accessible to the processing logic 204. In addition, the set-top box device 202 can include a network interface 208 adapted to facilitate communication between the notification system 202 and the residential gateway 240. In an illustrative embodiment, the set-top box device 202 can include a display interface 210 adapted to facilitate communication between the set-top box device 202 and the display device 212. Further, the set-top box device 202 can include a remote interface 214 adapted to facilitate communication between the set-top box device 202 and a remote control device 216.

The memory 206 includes a plurality of modules 222-230. The modules 222-230 can include computer instructions that are readable and executable by the processing logic 204 to implement various functions of the notification system 202 with respect to delivering home monitoring automation system alerts. For example, the modules 222-230 can represent various aspects of one or more software applications, operating systems, or other computer programs. In other embodiments, the modules 222-230 can be implemented as hardware logic or a combination of hardware logic and computer instructions.

The memory 206 includes a display module 222 that is executable by the processing logic 204 to receive video content via the IPTV access network 242 and to send the video content to the display device 212 via the display interface 210. The memory 206 also includes an API module 224 that is executable by the processing logic 204 to provide one or more application programming interfaces (APIs) at the display device 212 and to receive settings associated with one or more of the home automation systems 260-290 via the set-top box device 202. The settings can specify one or more triggering events, responses to each of the triggering event(s), whether a user is to be alerted of each of the triggering event(s), whether the set-top box device is to provide an interface to receive user input in response to each of the triggering event(s), other settings, or any combination thereof.

For example, the API module 224 can be adapted to receive settings associated with an environmental system indicating that the user is to be alerted when a particular temperature is detected by an HVAC system inside the user's home; when a certain temperature is detected outside the user's home; when a hazard is detected; when another environmental triggering event occurs; or any combination thereof.

In another example, the API module 224 can be executable by the processing logic 204 receive settings associated with a lighting system indicating that one or more lights within the user's home are to be changed when instructed by the set-top box device 202; when the user is detected coming into the home by the security system 280; when the user is away from the home at a certain time of day; when a possible intrusion is detected by the security system 280; when a doorbell rings; when other lighting triggering events occur; or any combination thereof.

In a further example, the API module 224 can be executable by the processing logic 204 to receive settings associated with an in-home monitoring system indicating that the user is to be alerted when a threshold noise level is detected by the in-home monitoring system (e.g., a noise level associated with a baby crying); when a computing system within the home accesses the Internet; when another in-home monitoring triggering event occurs; or any combination thereof.

In an additional example, the API module 224 can be executable by the processing logic 204 to receive settings associated with a security system indicating that the user is to be alerted when a threshold noise level is detected (e.g., a window breaking, pool water splashing); when a motion is detected; when an entry to the home or associated property is opened (e.g., a door or a gate); when a doorbell rings; when another security triggering event occurs; or any combination thereof.

In still another example, the API module 224 can be executable by the processing logic 204 to receive settings associated with the set-top box device 202 indicating that one or more responses (e.g., implement a certain lighting scene, silence one or more phones, etc.) are to be implemented at a start time of a particular television program, such as a video-on-demand movie, or upon selection of a channel, a type of television program, or a combination thereof.

The memory 206 includes a data store, to store user settings. In addition, the memory 206 includes an HAS module 228 that is executable by the processing logic 204 to send data indicating user settings to corresponding home automation systems. The settings data can include data specifying a triggering event, data indicating that the set-top box device is to be notified of the triggering event, other settings data related to user settings, or any combination thereof. For instance, the HAS module 228 can be executable by the processing logic 204 to send settings data to the environmental system 260 indicating a particular indoor temperature that a user has set a triggering event. In another example, the HAS module 228 can be executable by the processing logic 204 to send settings data to the security system 280 or the in-home monitoring system 290 indicating a threshold noise level that a user has set as a triggering event.

The memory 206 includes an event module 230 that is executable by the processing logic 204 to detect a triggering event. In one embodiment, the event module 230 can be executable by the processing logic 204 to detect a triggering event in response to data received from a home automation system indicating that the triggering event has occurred. For instance, the environmental system 260 can be adapted to detect an indoor temperature at a thermostat associated with the HVAC system 262 at the user's home, where the indoor temperature has been set by a user as a triggering event. The environmental system 260 can be adapted to send data to the set-top box device 202 via the HAS controller 250 indicating that the indoor temperature has been detected. The event module 230 can be executable by the processing logic 204 to detect that a triggering event has occurred, based on the data received from the environmental system 260 indicating that the indoor temperature has been detected.

In another example, the environmental system 260 can be adapted to detect an outdoor temperature (e.g., a freezing temperature) at a thermometer at the user's home, where the outdoor temperature has been set by a user as a triggering event. The environmental system 260 can be adapted to send data to the set-top box device 202 via the HAS controller 250 indicating that the outdoor temperature has been detected. The event module 230 can be executable by the processing logic 204 to detect that a triggering event has occurred, based on the data received from the environmental system 260 indicating that the outdoor temperature has been detected.

In a further example, the environmental system 260 can be adapted to detect a hazard via a hazard detection device 266, such as a smoke detector, fire alarm, gas detector, water leak detector, or other hazard detection device 266, where the hazard has been set by a user as a triggering event. The environmental system 260 can be adapted to send data to the set-top box device 202 via the HAS controller 250 indicating that the hazard has been detected. The event module 230 can be executable by the processing logic 204 to detect that a triggering event has occurred, based on the data received from the environmental system 260 indicating that the hazard has been detected.

In an additional example, the security system 280 can be adapted to detect a doorbell ringing, a possible intrusion, a user coming into the home, or another security triggering event, via at least one security camera 282, at least one motion detector 284, at least one security system controller 286, other device, or any combination thereof. The security system 280 can be adapted to send data to the set-top box device 202 via the HAS controller 250 indicating that the security triggering event has been detected. The event module 230 can be executable by the processing logic 204 to detect that a triggering event has occurred, based on the data received from the security system 280 indicating that the hazard has been detected.

In another example, the in-home monitoring system 290 can be adapted to detect a baby crying, breaking glass, a computing device connecting to the Internet, or another in-home triggering event, via at least one web camera 292, at least one microphone 294, at least one computing device 296, another device, or any combination thereof. The in-home monitoring system 290 can be adapted to send data to the set-top box device 202 via the HAS controller 250 indicating that the in-home triggering event has been detected. The event module 230 can be executable by the processing logic 204 to detect that a triggering event has occurred, based on the data received from the in-home monitoring system 290 indicating that the hazard has been detected.

In still another example, the set-top box device 202 can be adapted to detect a triggering event that occurs at the set-top box device, such as a user selecting a channel, a television program, a type of television program, or a combination thereof, set by a user as a triggering event. In other examples, the set-top box device 202 can detect one or more other triggering events, based on data received from other home automation systems indicating that triggering events set by a user have occurred.

The event module 230 is executable by the processing logic 204 to access user settings corresponding to a detected triggering event. The event module 230 is executable by the processing logic 204 is adapted to determine based on the user settings whether it is to alert a user in response to detecting the triggering event. For instance, if the triggering event is a detection of a temperature, a hazard, a threshold noise level, a security event, an in-home triggering event, the event module 230 can be executable by the processing logic 204 determine that the user is to be alerted. On the other hand, if the triggering event is the selection of a television program by the user, the event module 230 can be executable by the processing logic 204 determine that the user is not to be alerted.

The event module 230 is executable by the processing logic 204 to provide an alert to the user via the display device 212, when the set-top box device 202 is to alert the user. The alert can include video, audio, text, graphics, or any combination thereof. In an illustrative embodiment, the alert can include displaying content from a web camera or other camera via a picture-in-picture (PiP) display at the display device. For instance, if the triggering event is the detection of a threshold noise level by the in-home monitoring system 290, the HAS module 228 can be executable by the processing logic 204 to send a command to the in-home monitoring system 290 to activate the web camera 292 and to send video content from the web camera 292 to the set-top box device 202. The display module 222 can be executable by the processing logic 204 to send the video content received from the web camera 292 to the display device 212 for display via a PiP display 215.

In another example, if the triggering event is a doorbell ringing or possible intrusion, the HAS module 228 can be executable by the processing logic 204 to send a command to the security system 280 to activate the security camera 282 (e.g., a camera with a view of a front door) and to send video content from the security camera 282 to the set-top box device 202. The display module 222 can be executable by the processing logic 204 to send the video content received from the security camera 282 to the display device 212 for display via the PiP display 215.

In one embodiment, the event module 230 is executable by the processing logic 204 to determine based on user settings whether it is to provide an input interface in response to the triggering event. In a particular embodiment, a response can include alteration of at least one device associated with at least one home automation system 108. For example, where the triggering event includes the detection of a particular indoor temperature, the event module 230 can be executable by the processing logic 204 to provide a graphical user interface at the display device that includes selectable indicators of one or more options, such as activation or deactivation of a heater or air conditioner, a desired indoor temperature, other options, or any combination thereof.

In a particular embodiment, the event module 230 is executable by the processing logic 204 to determine whether it is to respond to the triggering event based on settings saved at the set-top box device 202, based on user input received via an interface provided at the display device 212, or a combination thereof. In one embodiment, the event module 230 can be adapted to provide a graphical user interface (GUI) or other interface in conjunction with an alert. The event module 230 can be executable by the processing logic 204 to receive input from a user via the interface, where the interface provides the user with one or more options to respond to the alert.

A response can include sending data to one or more of the home automation systems 260-290. For example, if the set-top box device 202 detects a triggering event that includes a user selection of a particular television program, the set-top box device event module 230 can be executable by the processing logic 204 to send data to a lighting system to change the level of one or more lights, according to user settings. In another example, if the triggering event includes detection of a particular temperature within the home, the event module 230 can be executable by the processing logic 204 to alert the user, according to user settings, and to receive user input indicating that an air conditioner or heater is to be activated or deactivated. The event module 230 can be executable by the processing logic 204 to send data to the HVAC system 260 indicating that the air conditioner or heater is to be activated or deactivated, according to the user input. In an additional example, the event module 230 can be executable by the processing logic 204 to alert the user of a hazard detected by a hazard detection device 266 and to receive user input indicating that the hazard detection device 266 (e.g., a smoke detector) is to be silenced or deactivated. The event module 230 can be executable by the processing logic 204 to send data to the HVAC system 260 indicating that the hazard detection device 266 is to be silenced or deactivated, according to the user input.

Figure 3:
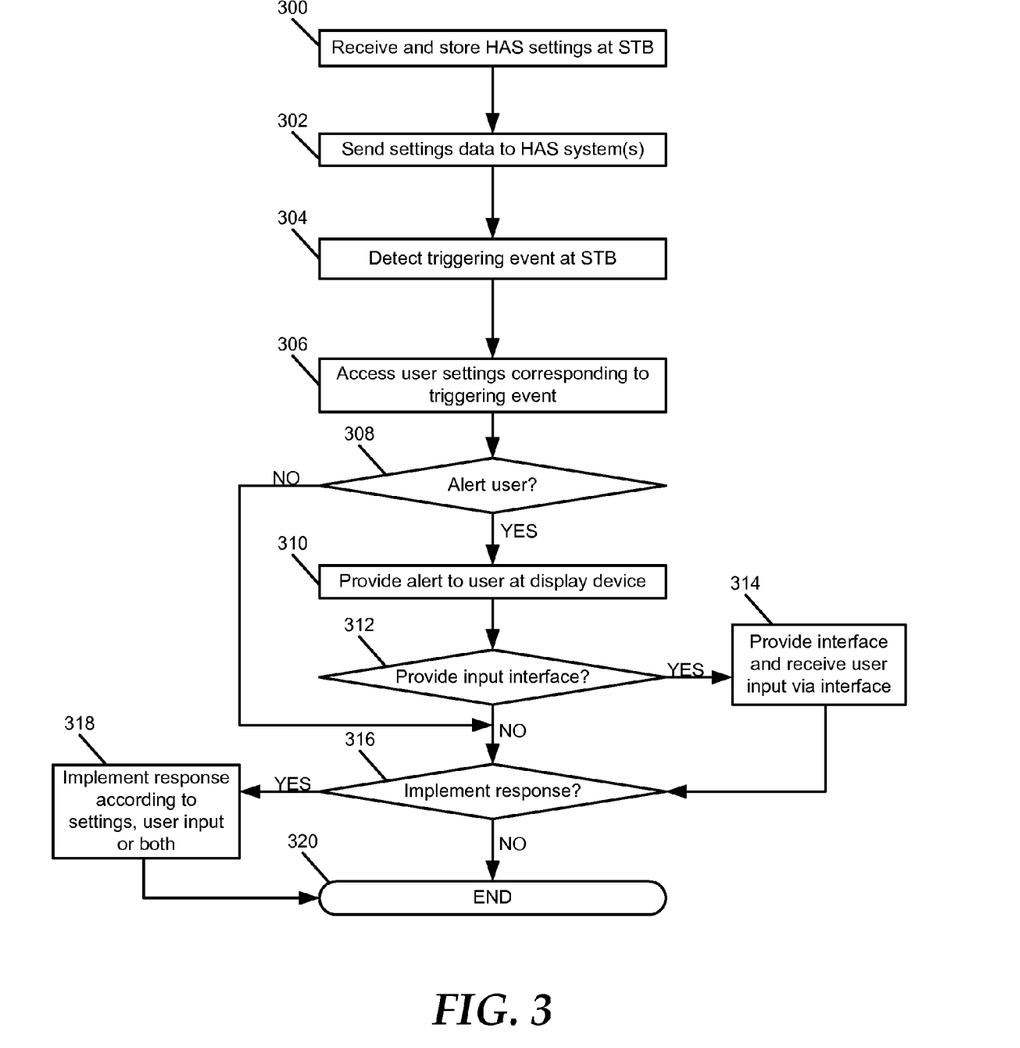
FIG. 3 is a flow diagram illustrating a particular embodiment of a method of interacting with home automation systems via a set-top box device.

FIG. 3 illustrates a particular embodiment of a method of delivering home monitoring and automation system alerts. At block 300, a set-top box device receives and stores settings related to at least one of a plurality of home automation systems (HASs). The settings can specify one or more triggering events, responses to each of the triggering event(s), whether a user is to be alerted of each of the triggering event(s), whether the set-top box device is to provide an interface to receive user input in response to each of the triggering event(s), other settings, or any combination thereof. Moving to block 302, in a particular embodiment, the set-top box device sends settings data to one or more home automation systems. For example, the set-top box device can send data specifying a triggering event, data indicating that the set-top box device is to be notified of the triggering event, other settings data related to user settings, or any combination thereof.

Proceeding to block 304, the set-top box device detects a triggering event. The set-top box device can detect a triggering event in response to data received from a home automation system indicating that the triggering event has occurred. The set-top box device can also detect a triggering event that occurs at the set-top box device, such as a user selecting a channel, a television program, a type of television program, or a combination thereof.

Continuing to block 306, the set-top box device accesses user settings corresponding to the triggering event. Advancing to decision node 308, the set-top box device determines, based on the user settings, whether it is to alert the user of the triggering event. If the set-top box device is not to alert the user, the method advances to decision node 316. Conversely, if the set-top box device determines that it is to alert the user, the method moves to block 310, and the set-top box device provides an alert to the user at a display device coupled to the set-top box device. The alert can include video, audio, text, graphics, or any combination thereof. In an illustrative embodiment, the alert can include video shown in a picture-in-picture (PiP) display from a web camera associated with a home automation system. In another illustrative embodiment, the alert can include text scrolling at the display device.

Proceeding to decision node 312, the set-top box device determines based on user settings whether it is to provide an input interface in response to the triggering event. For example, where the triggering event includes the detection of a particular indoor temperature, the set-top box device can provide a graphical user interface at the display device that includes selectable indicators of one or more options, such as activation or deactivation of a heater or air conditioner, a desired indoor temperature, other options, or any combination thereof. If the set-top box device determines that it is to provide an input interface in response to the triggering event, the method continues to block 314. At block 314, the set-top box device provides the input interface at the display device and receives user input via the interface.

Advancing to decision node 316, the set-top box device determines whether it is to implement a response to the triggering event based on user settings, user input, or a combination thereof. If the set-top box device determines that it is to implement a response, the method moves to block 318, and the set-top box device implements the response according to user settings, user inputs, or a combination thereof. For example, if the triggering event is the selection of a particular television program, the set-top box device can determine based on user settings that the set-top box device is to send data instructing a lighting system to change one or more lights to achieve a lighting scene specified by the user settings. In another example, if the set-top box device has received user input specifying a desired indoor temperature, the set-top box device can determine that it is to send data instructing an environmental system to activate or deactivate a heater or air conditioner.

Figure 4:
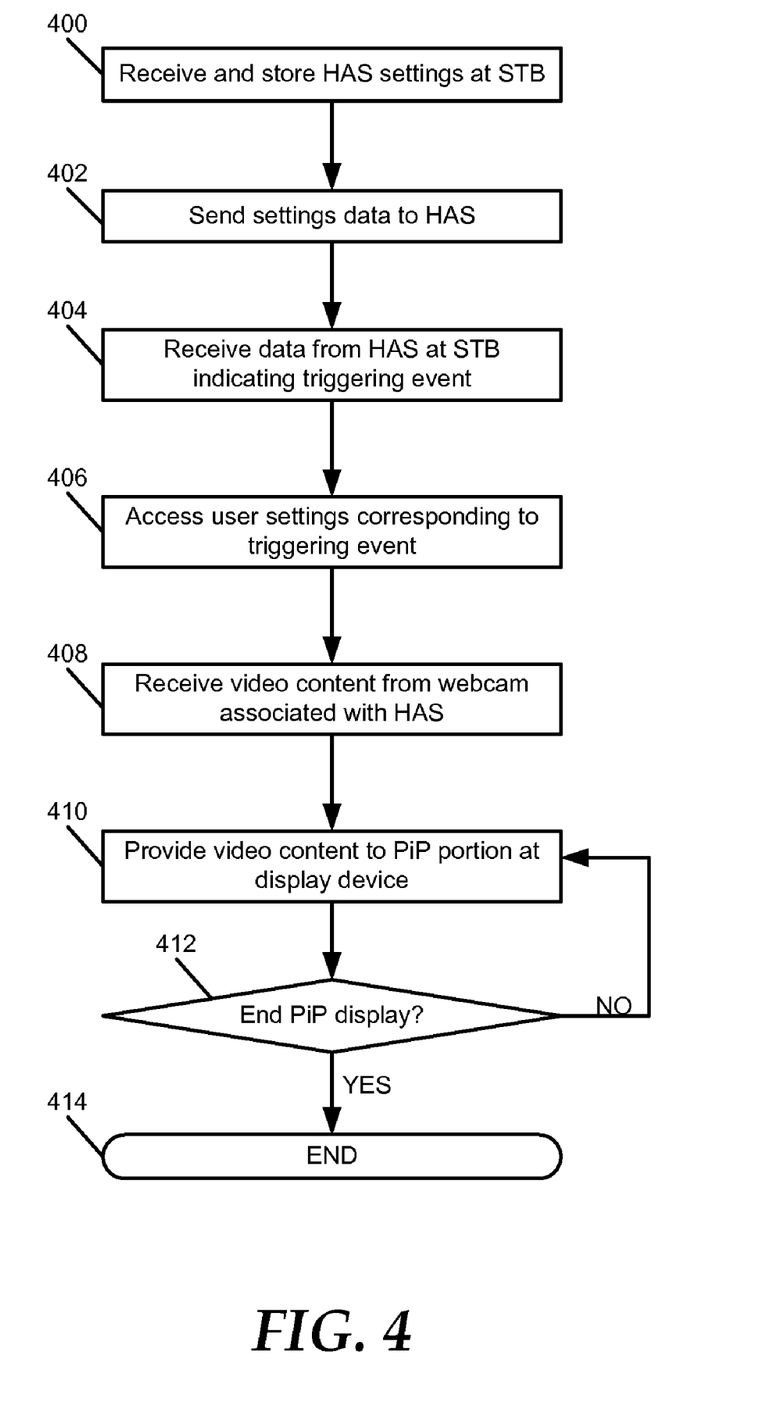
FIG. 4 is a flow diagram illustrating a second particular embodiment of a method of interacting with home automation systems via a set-top box device.

FIG. 4 illustrates a second particular embodiment of a method of delivering home monitoring and automation system alerts. At block 400, a set-top box device receives and stores settings related to a home automation system (HAS) that includes at least one web camera. The settings can specify one or more triggering events, responses to each of the triggering event(s), whether a user is to be alerted of each of the triggering event(s), whether the set-top box device is to provide an interface to receive user input in response to each of the triggering event(s), other settings, or any combination thereof.

Moving to block 402, in a particular embodiment, the set-top box device sends settings data to the home automation system specifying the triggering event(s), indicating that the set-top box device is to be notified of each of the triggering event(s), other settings data related to user settings, or any combination thereof.

Proceeding to block 404, the set-top box device receives data from the home automation system indicating that a triggering event has occurred. Continuing to block 406, the set-top box device accesses user settings corresponding to the triggering event. Advancing to block 408, the set-top box device receives video content from a web camera associated with the home automation system. In one embodiment, the set-top box device can pull the video from the web camera via the home automation system after the set-top box device is notified of the triggering event. In another embodiment, the settings data sent by the set-top box device can indicate that the set-top box device is to receive the video content from the web camera after the home automation system detects the triggering event.

At block 410, the set-top box device automatically provides the video content to a picture-in-picture (PiP) display at a display device coupled to the set-top box device. In other embodiments, the set-top box device can send an alert containing audio, text, graphics, or a combination thereof, to the display device and can provide the video content to the PiP display in response to a user command. Moving to decision node 412, the set-top box device determines whether it has received a command to end the PiP display. If the set-top box device has received such a command, the method terminates at 414.

Figure 5:
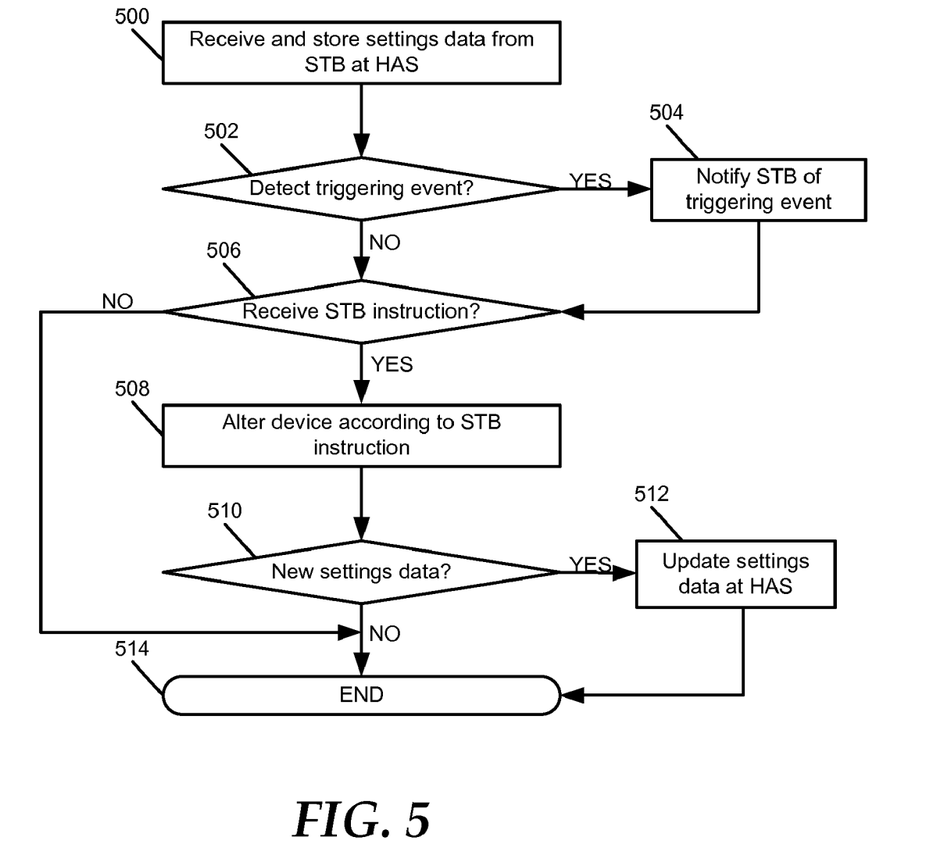
FIG. 5 is a flow diagram illustrating a third particular embodiment of a method of interacting with home automation systems via a set-top box device.

FIG. 5 shows a third particular embodiment of a method of interacting with home automation systems via a set-top box device. At block 500, a home automation system (HAS) receives and stores settings data from a set-top box device. The settings data can be received via a residential gateway, home automation system controller, other device, or any combination thereof. The settings data can include, for example, one or more triggering events detectable by the home automation system, an indication that the set-top box device is to be notified of a triggering event, other data, or any combination thereof.

Moving to block 502, the home automation system determines whether it has detected a triggering event. If the home automation system has not detected a triggering event, the method proceeds to decision node 506. On the other hand, if the home automation system has detected a triggering event, the method continues to block 504, and the home automation system sends data to the set-top box device indicating that the triggering event has occurred.

Advancing to decision node 506, the home automation system determines whether it has received an instruction from the set-top box device to alter a device, e.g., in response to a triggering event at the home automation system, at the set-top box device, at another home automation system, or any combination thereof. If the home automation system has not received such an instruction, the method terminates at 514. Whereas, if the home automation system has received an instruction from the set-top box device, the method moves to block 508, and the home automation alters the device according to the set-top box device instruction. Altering a device can include, for instance, activating or deactivating a heater or air conditioner or changing one or more lights.

Proceeding to decision node 510, the home automation system determines whether it has received new settings data from the set-top box device. If the home automation system receives new settings data, the method continues to block 512, and the home automation system updates settings data stored at the home automation system. The method terminates at 514.

Figure 6:
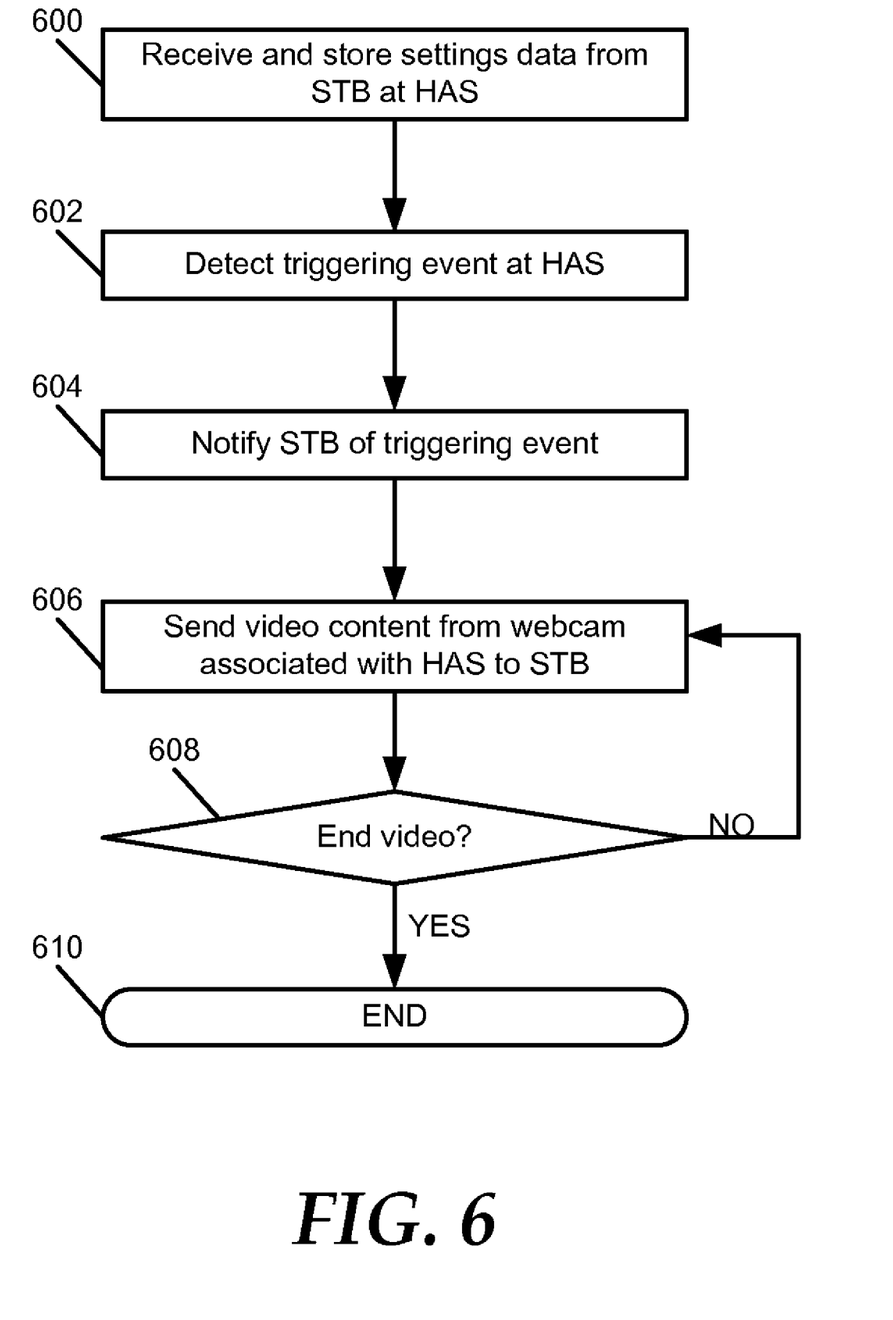
FIG. 6 is a flow diagram illustrating a fourth particular embodiment of a method of interacting with home automation systems via a set-top box device.

FIG. 6 shows a fourth method of interacting with home automation systems via a set-top box device. At block 600, a home automation system that includes a web camera receives settings data from a set-top box device. The settings data can include, for example, one or more triggering events detectable by the home automation system, an indication that the set-top box device is to be notified of a triggering event, other data, or any combination thereof. For example, an in-home monitoring system can receive settings data from the set-top box device indicating that detection of a noise level, frequency, other noise characteristic, or any combination thereof, corresponding to an infant crying is a triggering event, an indication that the set-top box device is to be notified when the triggering event occurs, and an indication that video from a web camera in the infant's room or other location is to be sent to the set-top box device when the triggering event occurs.

Moving to block 602, the home automation system detects a triggering event. For example, the in-home automation system can detect the noise characteristic(s) indicated by settings data received from the set-top box device. Proceeding to block 604, the home automation system sends data to the set-top box device indicating that the triggering event has occurred. Continuing to block 606, the home automation system sends video content from the web camera to the set-top box device. Advancing to decision node 608, the home automation system determines whether it has received an instruction from the set-top box device to stop sending video. If the home automation system receives such an instruction, the method terminates at 610.

In some embodiments, the methods described in FIGS. 3-6 can be performed as described. In other embodiments, some aspects of the methods can be performed in alternative sequences or simultaneously.

Figure 7:
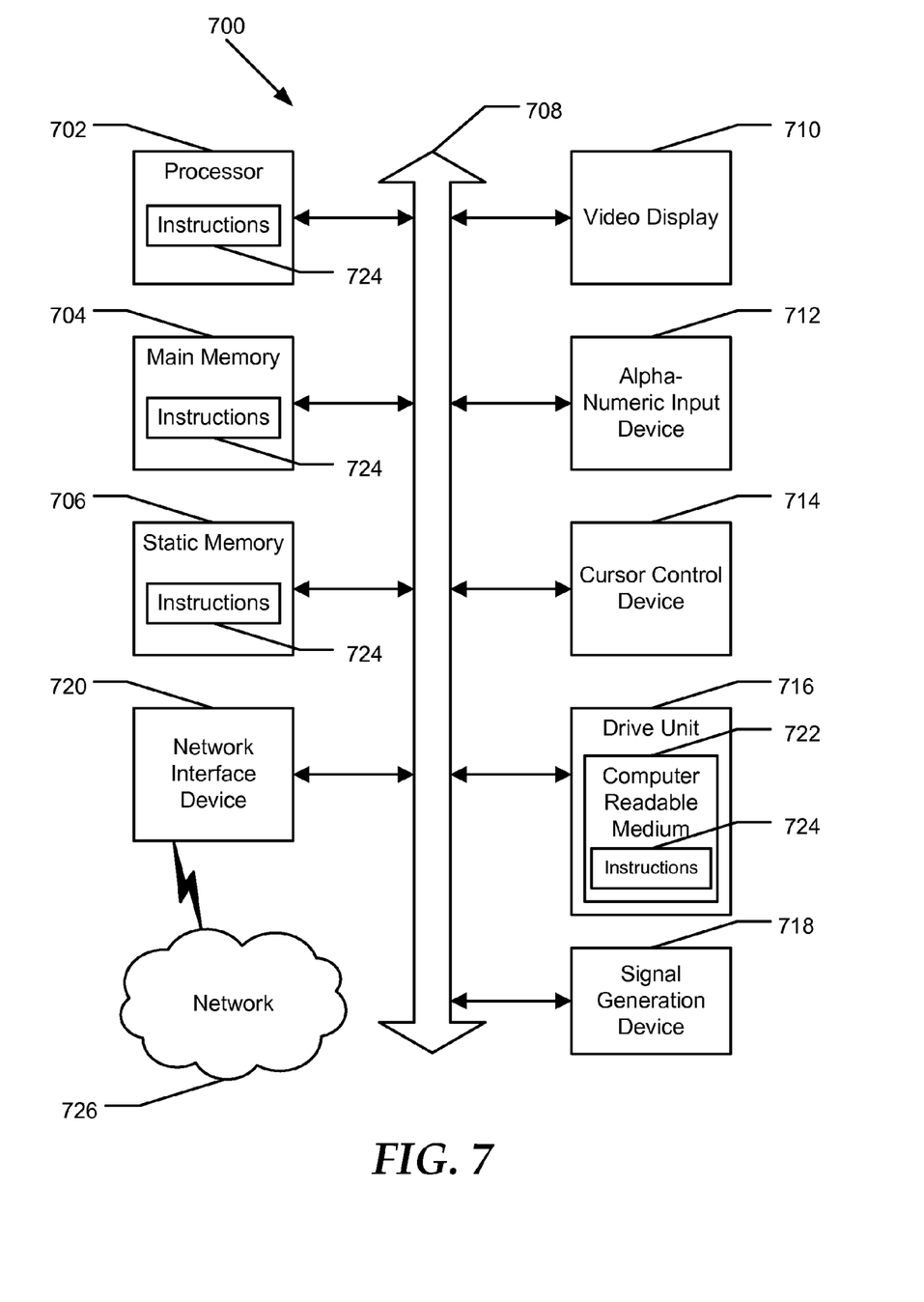
FIG. 7 is a block diagram illustrating a particular embodiment of a general computer system.

FIG. 7 shows an illustrative embodiment of a general computer 700 including a set of instructions that can be executed to cause the computer system to perform any one or more of the methods or computer based functions disclosed herein. The computer system 700 may operate as a standalone device or may be connected, e.g., using a network, to other computer systems or peripheral devices. In an illustrative embodiment, such standalone and peripheral devices can include, for example, set-top box devices, home automation system elements, residential gateway devices, televisions, other display devices, or any combination thereof, as illustrated in FIGS. 1-2.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media. The network interface device 720 can provide connectivity to a network 726, e.g., a wide area network (WAN), a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the Figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method of interacting with a home automation system by a set-top box device coupled to an Internet Protocol Television (IPTV) network, the method comprising:

sending, by the set-top box device, a plurality of graphical user interfaces received from the set-top box device to a display device coupled to the set-top box device;

receiving, by the set-top box device via the plurality of graphical user interfaces displayed on the display device, user settings for each device of a plurality of devices in the home automation system, wherein the user settings include setting data specifying at least one triggering event and responses to each of the at least one triggering event;

transmitting, by the set-top box device, via a residential gateway coupled to the set-top box device, the user settings to each device in the home automation system to store the user settings in each device;

receiving by the set-top box device, data from at least one device of the plurality of devices in the home automation system via the residential gateway, wherein the home automation system monitors a plurality of environmental events, wherein the data received by the set-top box device indicates that the at least one triggering event has been detected at one of the plurality of devices in the home automation system based on the user settings, wherein the plurality of devices in the home automation system comprise an environmental hazard detector, a thermometer, a heating ventilation, an air-conditioning system, a baby monitoring system including a web camera, or a security system, and wherein the plurality of environmental events comprise a hazard being detected, a desired indoor temperature, a noise characteristic or any combination thereof;

sending, by the set-top box device to the display device, an alert indicating that the at least one triggering event has been detected at one of the plurality of devices based on the user settings, wherein the alert generates a graphical user interface including selectable indicators of options to respond to the alert, and receiving user input via the selectable indicators of options in the graphical user interface to control additional processing of the at least one triggering event;

in response to the at least one triggering event, identifying by the set-top box device, based on the user settings, at least one device associated with the environmental hazard detector, the thermometer, the heating ventilation, the air conditioning system, the baby monitoring system, or the security system, for responding to the at least one triggering event, wherein the at least one device is different from the display device; and sending, by the set-top box device based on the user settings and without user input, output data to the home automation system, the output data including an instruction to alter an operation of the at least one device identified by the set-top box device.

2. The method of claim 1, comprising receiving, by the set-top box device, the user settings for controlling the alert sent to the display device.

3. The method of claim 2, comprising accessing, by the set-top box device, the user settings before sending the alert to the display device.

4. A method of interacting with a home automation system a set-top box device coupled to an Internet Protocol Television (IPTV) network, the method comprising:

sending, by the set-top box device, a plurality of graphical user interfaces received from the set-top box device to a display device coupled to the set-top box device;

receiving, by the set-top box device via the plurality of graphical user interfaces displayed on the display device, user settings for each device of a plurality of devices in the home automation system, wherein the user settings include setting data specifying at least one triggering event and responses to each of the at least one triggering event;

transmitting, by the set-top box device, via a residential gateway coupled to the set-top box device, the user settings to each device in the home automation system to store the user settings in each device;

receiving by the set-top box device, data from at least one device of the plurality of devices in the home automation system via the residential gateway, wherein the home automation system monitors a plurality of environmental events, wherein the set-top box device communicates with the home automation system via the residential gateway including at least an environmental system, wherein the data indicates that the at least one triggering event has been detected at one of the plurality of devices in the home automation system based on the user settings, and wherein the plurality of devices in the home automation system comprises an environmental hazard detector, a thermometer, a heating ventilation and air-conditioning system, or any combination thereof;

receiving, by the set-top box device, video content from a camera associated with the home automation system;

sending, by the set-top box device to the display device, an alert indicating that the at least one triggering event has been detected at one of the plurality of devices based on the user settings, wherein the alert includes the video content and generates a graphical user interface including selectable indicators of options that enables the specification and settings of multiple triggering events and responses to each of the multiple triggering events, and receiving user input via the selectable indicators of options in the graphical user interface to control additional processing of the at least one triggering event;

in response to the at least one triggering event, identifying, by the set-top box device, based on the user settings, at least one device associated with the at least one triggering event and associated with one of the environmental hazard detector, the thermometer, the heating ventilation and air-conditioning system, or any combination thereof for responding to the at least one triggering event, wherein the at least one device is different from the display device; and  sending, by the set-top box device based on the user settings and without user input, output data to the home automation system, the output data including an instruction to alter an operation of the at least one device identified by the set-top box device.

5. The method of claim 4, wherein receiving user input via the selectable indicators of options in the graphical user interface to control additional processing of the at least one triggering event comprising receiving an input to perform one of silencing the environmental hazard detector, deactivating the environmental hazard detector, activating the heating ventilation and air-conditioning system, deactivating the heating ventilation and air-conditioning system, or any combination thereof.

6. The method of claim 4, wherein the video content is displayed in a picture-in-picture portion of the display device.

7. The method of claim 4, wherein the output data instructs the home automation system to send the video content to the set-top box device.

8. A set-top box device coupled to an Internet Protocol Television (IPTV) network, the set-top box device comprising:

a residential gateway interface to receive data from a home automation system via a residential gateway;

a memory to store computer instructions;

processing logic coupled to the memory, wherein the processing logic, responsive to executing the computer instructions, performs operations comprising:

sending a plurality of graphical user interfaces received from the set-top box device to a display device coupled to the set-top box;

receiving via the plurality of graphical user interfaces displayed on the display device, user settings for each device of a plurality of devices in the home automation system, wherein the user settings include setting data specifying at least one triggering event and responses to each of the at least one triggering event;

transmitting via the residential gateway coupled to the set-top box device, the user settings to each device in the home automation system to store the user settings in each device;

receiving by the set-top box device, data from at least one device of the plurality of devices in the home automation system via the residential gateway, wherein the home automation system monitors a plurality of environmental events, wherein the set-top box device communicates with the home automation system via the residential gateway including at least an environmental system, wherein the data indicates that the at least one triggering event has been detected at one of the plurality of devices in the home automation system based on the user settings, and wherein the plurality of devices in the home automation system comprise an environmental hazard detector, a thermometer, a heating ventilation and air-conditioning system, or any combination thereof;

sending to the display device an alert indicating that the at least one triggering event has been detected at one of the plurality of devices based on the user settings, wherein the alert generates a graphical user interface including selectable indicators of options to respond to the alert that enables the specification and settings of multiple triggering events and responses to each of the multiple triggering events;

receiving an input via the selectable indicators of options in the graphical user interface to control additional processing of each of the at least one triggering event;

in response to the at least one triggering event, identifying based on the user settings, at least one environmental device associated with the at least one triggering event for responding to the at least one triggering event, wherein the at least one environmental device is different from the display device; and sending based on the user settings and without user input, output data to the home automation system, the output data including an instruction to alter an operation of the at least one environmental device identified by the set-top box device.

9. The set-top box device of claim 8, wherein the alert comprises at least one of video, audio, text, graphics, or any combination thereof.

10. The set-top box device of claim 8, wherein the processing logic, responsive to executing the computer instructions, performs operations comprising receiving the user settings related to the at least one triggering event via at least one application programming interface.

11. The set-top box device of claim 8, wherein the processing logic, responsive to executing the computer instructions, performs operations comprising receiving video content from a camera associated with the home automation system that supplied the data and wherein the alert includes the video content.

12. The set-top box device of claim 11, wherein the home automation system supplying the data further comprises a child monitoring system; wherein the at least one triggering event is a detection of at least one noise characteristic by the child monitoring system; and wherein the camera is a web camera.

* * * * *